US008809686B2

(12) United States Patent
Borjesson et al.

(10) Patent No.: US 8,809,686 B2
(45) Date of Patent: Aug. 19, 2014

(54) ELECTRICAL BUSHING

(71) Applicants: Jan-Ake Borjesson, Ludvika (SE); Goran Eriksson, Vasteras (SE); Sari Laihonen, Vasteras (SE); Manoj Pradhan, Balsta (SE); Peter Sjoberg, Ludvika (SE); Mikael Unge, Vasteras (SE)

(72) Inventors: Jan-Ake Borjesson, Ludvika (SE); Goran Eriksson, Vasteras (SE); Sari Laihonen, Vasteras (SE); Manoj Pradhan, Balsta (SE); Peter Sjoberg, Ludvika (SE); Mikael Unge, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/646,312

(22) Filed: Oct. 5, 2012

(65) Prior Publication Data

US 2013/0025911 A1 Jan. 31, 2013

Related U.S. Application Data

(63) Continuation of application No. PCT/EP2011/055238, filed on Apr. 5, 2011.

(30) Foreign Application Priority Data

Apr. 7, 2010 (EP) .................................... 10159180

(51) Int. Cl.

| | |
|---|---|
| ***H01B 17/28*** | (2006.01) |
| ***H02G 15/00*** | (2006.01) |
| ***H01B 17/00*** | (2006.01) |
| ***H01B 17/42*** | (2006.01) |
| ***H01T 4/14*** | (2006.01) |
| ***H02G 7/20*** | (2006.01) |

(52) U.S. Cl.
USPC ... 174/143; 174/73.1; 174/137 R; 174/140 R; 174/144; 174/149 R

(58) Field of Classification Search
USPC ..... 174/73.1, 137 R, 142–144, 152 E, 152 R, 174/140 R, 149 R
See application file for complete search history.

(56) References Cited

U.S. PATENT DOCUMENTS 2,288,969 A * 7/1942 Kirkwood ..................... 174/143
3,210,461 A 10/1965 Berg et al.

(Continued)

FOREIGN PATENT DOCUMENTS

EP 0244957 A1 11/1987
EP 1736998 A1 12/2006

(Continued)

OTHER PUBLICATIONS

International Preliminary Report on Patentability; Application No. PCT/EP2011/055238; Completed: Apr. 2, 2012; 15 pages.

(Continued)

*Primary Examiner* — Jeremy C Norris
*Assistant Examiner* — Sherman Ng
(74) *Attorney, Agent, or Firm* — St. Onge Steward Johnston & Reens LLC

(57) ABSTRACT

An electrical bushing for providing electrical insulation of a conductor extending through the bushing is disclosed. The bushing includes: one conductive foil concentrically arranged around the conductor location; and one FGM part, made from a field grading material and partly arranged in the extension of part of a foil edge of a conductive foil. The FGM part and the conductive foil, in the extension of which the FGM part is arranged, are in electrical contact.

23 Claims, 6 Drawing Sheets

(56) References Cited

U.S. PATENT DOCUMENTS

| | | | | |
|---|---|---|---|---|
| 3,318,995 | A | 5/1967 | Buckley et al. | |
| 3,462,545 | A * | 8/1969 | Grimmer | 174/143 |
| 3,646,251 | A | 2/1972 | Friedrich | |
| 3,659,033 | A | 4/1972 | Grimmer | |
| 3,770,877 | A * | 11/1973 | Mashikian et al. | 174/143 |
| 3,823,334 | A * | 7/1974 | Philofsky et al. | 310/196 |
| 4,252,692 | A | 2/1981 | Taylor et al. | |
| 4,338,487 | A * | 7/1982 | Matsuo | 174/143 |
| 4,370,514 | A | 1/1983 | Matthaus et al. | |
| 4,473,765 | A * | 9/1984 | Butman et al. | 310/215 |
| 4,847,450 | A * | 7/1989 | Rupprecht | 174/143 |
| 6,124,549 | A * | 9/2000 | Kemp et al. | 174/73.1 |
| 2004/0129449 | A1 * | 7/2004 | Boettcher et al. | 174/138 F |
| 2005/0199418 | A1 | 9/2005 | Donzel et al. | |

FOREIGN PATENT DOCUMENTS

| | | | |
|---|---|---|---|
| EP | 1975949 | A1 | 10/2008 |
| RU | 2378726 | C2 | 1/2010 |
| RU | 2008128470 | A | 1/2010 |
| WO | 2006010280 | A1 | 2/2006 |
| WO | 2007068130 | A1 | 6/2007 |

OTHER PUBLICATIONS

International Search Report and Written Opinion of the International Searching Authority; Application No. PCT/EP2011/055238; Completed Jul. 11, 2011; Mailing Date: Jul. 18, 2011; 12 pages.

* cited by examiner

ELECTRICAL BUSHING

FIELD OF THE INVENTION

The present invention relates to the field of high voltage technology, and in particular to high voltage bushings for providing electrical insulation of a conductor.

BACKGROUND OF THE INVENTION

High voltage bushings are used for carrying current at high potential through a plane, often referred to as a grounded plane, where the plane is at a different potential than the current path. High voltage bushings are designed to electrically insulate a high voltage conductor, located inside the bushing, from the grounded plane. The grounded plane can for example be a transformer tank or a wall.

In order to obtain a smoothening of the electrical potential distribution between the conductor and the grounded plane, a bushing often comprises a number of floating, coaxial foils made of a conducting material and coaxially surrounding the high voltage conductor, the coaxial foils forming a so called condenser core. The foils could for example be made of aluminium, and are typically separated by a dielectric insulating material, such as for example oil impregnated or resin impregnated paper. The coaxial foils serve to smoothen the electric field distribution between the outside of the bushing and the inner high voltage conductor, thus reducing the local field enhancement. The coaxial foils help to form a more homogeneous electric field, and thereby reduce the risk for electric breakdown and subsequent thermal damage.

Such coaxial foils typically provide efficient capacitive grading of the electric field within the bushing. However, a local field enhancement in the vicinity of the foil edges typically remains. The enhanced field at the foil edges limits the operational voltage that can be applied between the high voltage conductor and the grounded plane.

Efforts to grade the electric field at the foil edges of a bushing condenser core are disclosed in U.S. Pat. No. 4,370,514. Here, double layer foils containing an electrically conducting layer and an insulating layer are coaxially arranged around a high voltage conductor, where the insulating layer has a high dielectric constant. At the foil edges, the double layer foils are folded so that the insulating layer encloses the electrically conducting layer in order to improve the ability of the bushing to withstand partial corona discharges and surge voltages. U.S. Pat. No. 4,370,514 also discusses the possibility of limiting the field stress around the foil edges by terminating the foils with a bead-like enlargement, in order to obtain a radius of curvature at the edge which is as large as possible.

The techniques for reducing the field stress at the foil edges discussed in U.S. Pat. No. 4,370,514 increase the radius of the condenser core, and therefore the radius of the bushing. As the electric power technology advances, higher voltages can be employed in various applications and bushings which may withstand higher potentials are therefore required. At the same time, the physical space available to a bushing is typically limited. Therefore, it is desired to find bushings that have an improved relationship between voltage-withstanding properties and bushing diameter.

SUMMARY OF THE INVENTION

An object of the present invention is to provide a bushing having an improved relationship between voltage-withstanding properties and bushing diameter.

This object is achieved by an electrical bushing for providing electrical insulation of a conductor extending through the bushing. The bushing comprises at least one conductive foil concentrically arranged around the conductor location, and at least one field grading material (FGM) part, comprising (and typically made from) a field grading material and at least partly arranged in the extension of at least part of a foil edge of a conductive foil. The FGM part and the conductive foil, in the extension of which the FGM part is arranged, are in electrical contact.

The electrical field at the foil edge will thus be graded by the FGM part at local electric field strengths above the electric field threshold of the field grading material. Since an enhanced electric field strength at the foil edges is often limiting when attempting to decrease the dimensions of a bushing designed for a particular voltage, or when attempting to increase the nominal voltage for a particular bushing dimensioning, the field grading achieved by the FGM part at the foil edge allows for an improved relationship between voltage-withstanding properties and bushing diameter.

The field grading material can advantageously be a non-linear field grading material. When a non-linear field grading material is used, an FGM part will typically provide efficient field grading over a larger range of voltages.

The field grading material could for example be chosen such that an electrical field threshold of the field grading material, above which the field grading capability of the field grading material increases non-linearly with increasing electric field strength, lies above the local electric field strength expected at the foil edge at the nominal voltage of the bushing. Oftentimes, the field grading material will be chosen such that the electrical field threshold of the field grading material lies above the local electric field strength expected at the foil edge at twice the nominal voltage of the bushing. In some embodiments, a field grading material will be used that has an electric field threshold which lies below the local electric field strength expected at the foil edge at the nominal voltage of the bushing. By using an FGM part that provides field grading also at nominal voltage, aging effects around the foil edges may be mitigated.

In one embodiment, an extension distance over which an FGM part extends beyond at least part of the conductive foil edge substantially corresponds to the interfoil separation distance. Hereby can be achieved that the originally enhanced electric field strength at the foil edge can be reduced to a similar level to that found in the bulk of the condenser core.

The extension distance could for example be selected such that the electric field strength at the edge of the FGM part will be below the partial discharge inception threshold of the dielectric insulating material even for voltages above twice the nominal voltage of the bushing.

The bushing may comprise a plurality of concentrically arranged conductive foils, each conductive foil having two outer foil edges. In one embodiment, an FGM part is arranged in the extension of substantially every outer foil edge, for example in the extension of every outer foil edge at which the local field would otherwise be considerably enhanced. In some geometries, the local field enhancement at some foil edges, for example the edges of the innermost foil, may not experience as strong local field enhancement as the majority of the conductive foils. By equipping substantially every outer foil edge of the bushing with an FGM part, the risk of bushing failure due to a local enhancement of the electrical field at outer foil edges can be minimized for situations when the stress is evenly distributed among the foil edges, such as for example at nominal voltage or withstand voltage.

A conductive foil of an electric bushing may have inner edges, such as for example edges of an opening in the conductive foil through which conductive leads can be arranged, or edges between by two cylindrical and axially displaced conductive foil parts forming the conductive foil. In one embodiment, an FGM part is at least partly arranged in the extension of at least part of an inner foil edge. Efficient field grading can thus be achieved also around such inner foil edges.

In order to further improve the field grading properties of the FGM part, the outer edge of the FGM part can be of a field grading geometrical shape.

The FGM part could for example be made from a tape of field grading material having non-linear electric properties.

Alternatively, the FGM part could for example be formed by field grading material that has been applied to at least part of a dielectric insulator arranged to provide insulation between adjacent conductive foils.

Further aspects of the invention are set out in the following detailed description and in the accompanying claims.

DETAILED DESCRIPTION OF THE INVENTION

Figure 1:
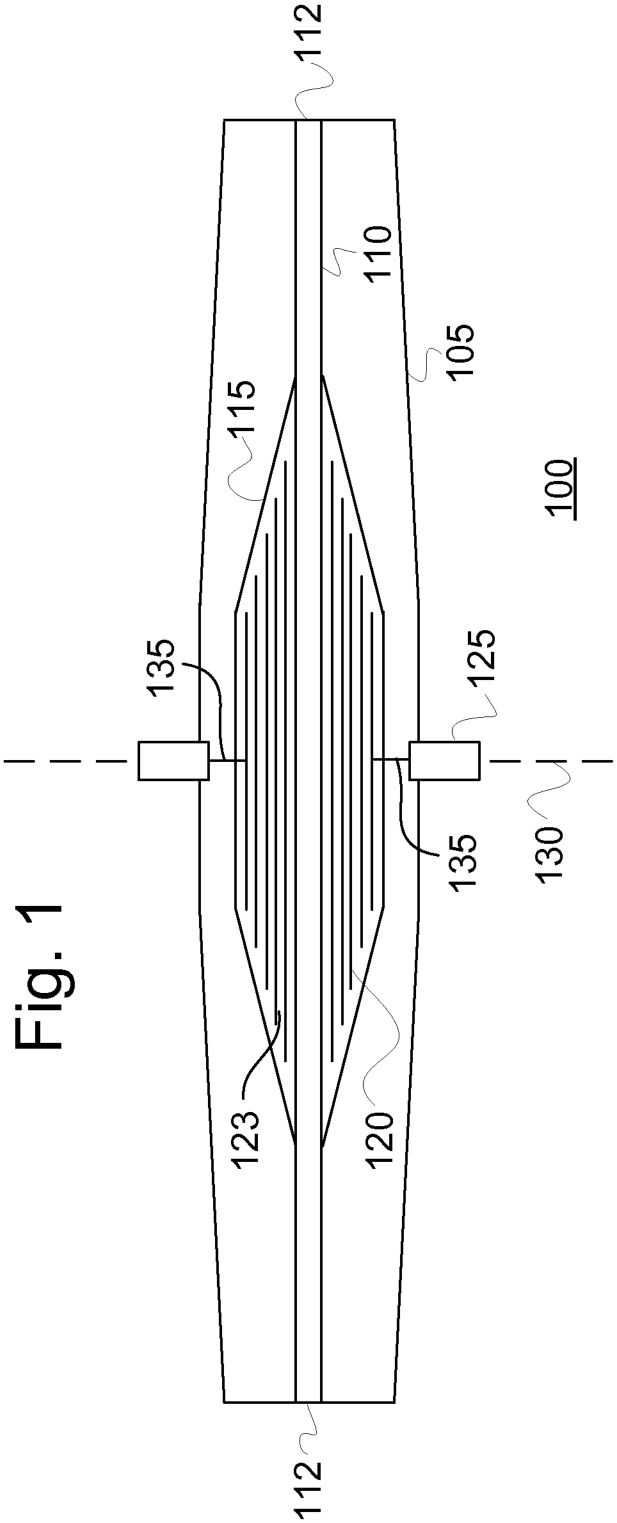
FIG. 1 is a schematic illustration of an example of a bushing having a condenser core.

FIG. 1 schematically illustrates a bushing 100 comprising a hollow, elongate insulator 105 through which a conductor 110 extends. At each end of the conductor 110 is provided an electrical terminal 112 for connecting the conductor 110 to electrical systems or devices. Bushing 100 of FIG. 1 furthermore comprises a condenser core 115. In FIG. 1, the conductor 110 has been shown to form part of the bushing 100. However, some bushings 100 do not include a conductor 110, but include a pipe-shaped hole in the conductor location in which a conductor 110 may be inserted.

The condenser core 115 of FIG. 1 comprises a number of foils 120 which are separated by a dielectric insulator 123. The dielectric insulator 123 is typically made of a solid insulating material, such as oil- or resin impregnated paper. The foils 120 are typically coaxially arranged, and could for example be made of aluminium or other conducting material. The foils 120 could be integrated with the dielectric material, or separate from the dielectric material. Integration of the foil with the dielectric material could for example be achieved by means of a vacuum metallisation process, or by applying conductive ink to the dielectric material. A condenser core 115 can for example be in the shape of a cylinder or of a cylinder having a conical end part as shown in FIG. 1. The foils are often of cylindrical shape. Oftentimes, the axial length of an outer foil 120 is smaller than the axial length of an inner foil 120 so as to maintain a similar area of the different foils 120 in a condenser core 115.

The bushing of FIG. 1 further comprises a flange 125 to which the insulator 105 is attached. The flange 125 can be used for connecting the bushing 100 to a plane 130 through which the conductor 110 is to extend. The flange 125 is often electrically connected to the outermost conductive foil 120, as indicated in FIG. 1 by connection 135. Plane 130 may be connected to ground, or can have a potential which differs from ground. However, for ease of description, the term grounded plane will be used when referring to the plane 130.

When the bushing 100 is in use, the condenser core 115 acts as a voltage divider and distributes the field substantially evenly within the condenser core 115.

While the conductive foils 120 efficiently serve to capacitatively grade the electric field within the bushing 100, the electrical field in the vicinity of the conductive foil edges is locally enhanced due to boundary effects. Typically, the electric field enhancement at foil edges is stronger the thinner the foils 120 are (in the limit of extremely thin foils 120, the electric field strength at the edges formally tend to infinity). Since high electric field strengths at the foil edges may cause failure in terms of for example partial discharge or flashover, field grading would be beneficial.

According to the present technology, field grading at a foil edge may be achieved by arranging a Field Grading Material (FGM) part (at least partly) in the extension of at least part of an edge of a conductive foil 120 so that the FGM part is in electrical contact with the conductive foil, the FGM part being made from a field grading material.

An FGM part may be designed so as to provide efficient field grading for a certain range of voltages across the bushing 100 in the radial direction. For example, the FGM part may be designed so as to provide efficient field grading at and/or above a voltage where the local enhancement of the electric field strength at an edge of a conductive foil would be dimensioning for the bushing 100 unless field grading measures were taken. A critical voltage condition, corresponding to a particular voltage across the bushing 100 above which the most efficient field grading is desired (such voltage here referred to as the critical voltage), could advantageously be selected. Depending on the design of the bushing 100, the critical voltage could for example be the nominal voltage of the bushing; a withstand voltage of the bushing, i.e. a voltage higher than the nominal voltage which the bushing 100 should be capable of withstanding during a longer period of time (typically twice the nominal voltage); a voltage occurring at a lighting impulse (e.g. the Basic Insulation Level, BIL, also referred to as the basic impulse withstand voltage), or a high frequency or transient voltage (at a magnitude of for example 3-5 times the nominal voltage).

The field grading material can advantageously be a non-linear field grading material, the design thereby providing efficient field grading in a larger range of voltage situations. A suitable non-linear field grading material has electric properties that depend on the local electric field strength E to which the material is exposed, in a manner so that a high amount of field grading is achieved at high electric fields, while the impact on the field distribution is small or negligible at lower electric fields. The non-linear field grading property of the field grading material is a result of the material having a conductivity or permittivity that depends non-linearly on the electric field.

Non-linear field grading materials are typically associated with a (material dependent) electric field threshold $E_b$, above which the field grading properties of the material changes rapidly with increasing electric field, while for electric fields having a magnitude below the threshold $E_b$, the field grading effect obtained by the field grading material is considerably lower or negligible. Due to the changes of the electrical properties of the material with variations in electric field, an inhomogeneous electric field distribution wherein the electric field (at least) locally exceeds the electric field threshold $E_b$, will, in the presence of an FGM material, become more uniform than in the absence of FGM, since the electric stress in the region/spots where the electric field strength originally exceeded $E_b$ will be reduced. Depending on the composition of the field grading material, the electric field threshold $E_b$ can be more or less sharp.

Field grading materials can for example be polymer composites where an insulating polymer is filled with particles giving rise to non-linear electric properties. The non-linear electric properties can for example be achieved by an intrinsic non-linearity of the material of the filler particles, as a grain-boundary effect, or as a combination of the two. The filler particle size could for example lie within the range of 10-150 μm, or 10-100 nm, or any other suitable particle size could be used. All filling particles could be of the same material, or a mixture of particles of different composition could be used. A non-linear field grading material can have non-linear resistive properties (non-linear varistor properties), so that the conductivity increases non-linearly with increasing electric field strength, or non-linear capacitive properties, so that the dielectric constant increases non-linearly with increasing electric field strength.

Typical non-linear resistive field grading materials have a low and almost constant conductivity $\sigma_0$ below an electric field threshold $E_b$, while the conductivity increases rapidly with increasing electric field for electric fields higher than $E_b$. Below $E_b$, non-linear resistive field grading materials typically have electric properties closer to those of insulators, depending on the amount of filler in the field grading material. Above $E_b$, the current-voltage-relation can typically be described as $I \propto V^{\alpha+1}$, where $\alpha>0$. Examples of materials which could be used in filling particles to achieve non-linear resistive properties of the field grading material are SiC, ZnO, $TiO_2$, $SnO_2$, $BaTiO_3$, carbon black or semi-conducting polymer fillers. Non-linear capacitive field grading materials have a low and almost constant dielectric constant $\in_r$ below an electric field threshold $E_b$, while the dielectric constant increases rapidly at electric fields of magnitude higher than $E_b$. An example of a material which could be used in filling particles to achieve non-linear capacitive properties of the field grading material is $BaTiO_3$.

The insulating polymer of the field grading material can for example be an elastomer such as ethylene propyle diene monomer (EPDM) or silicon rubbers; a thermoplastic polymer such as polyethylene, polypropylene, polybutylene terephthalate (PBT), polyethylene terephthalate (PET), polycarbonate (PC), acrylonitrile butadiene styrene (ABS), polystyrene (PS) or nylon; a thermosetting polymer such as epoxy or polyurethane resin; an adhesive such as those formed based on ethylene-vinyl-acetate; a thermoplastic elastomer; a thixotropic paint or gel; or a combination of such materials, including co-polymers, for example a combination of polyisobutylene and amorphous polypropylene. In order to achieve other desired properties of the field grading material, for example in terms of mechanical properties, further components may be included, as described for example in EP1975949 and U.S. Pat. No. 4,252,692.

By arranging an FGM part in the extension of at least part of an edge of a conductive foil, local field grading at conductor foil edges is achieved when the magnitude of the local electric field, at the location of the FGM part, reaches above the electric field threshold $E_b$ of the field grading material. The FGM part thus operates to grade a local electric field at the conductive foil edge when the voltage in the radial direction of the bushing takes a magnitude above a voltage threshold. The FGM part could for example be designed so that such voltage threshold corresponds to the critical voltage.

Figure 2:
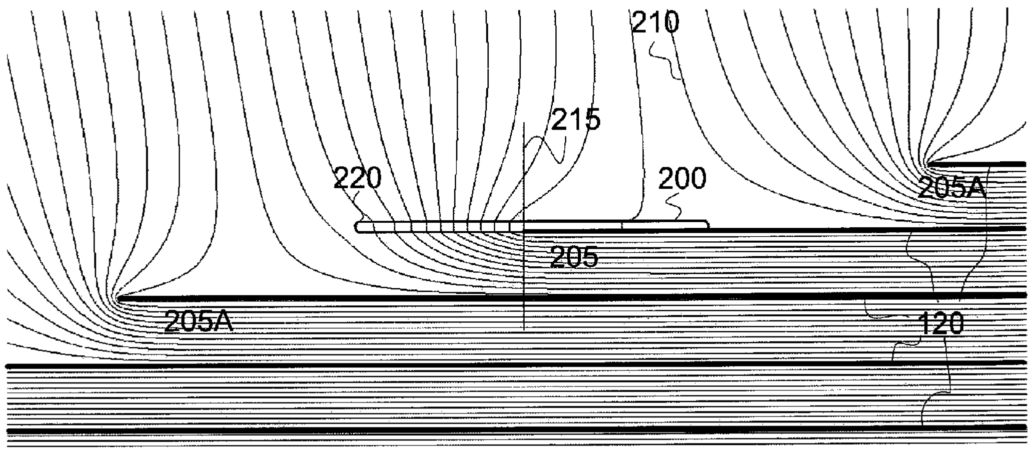
FIG. 2 illustrates results from simulations of the electric field in the vicinity of conductive foil edges with and without an FGM part.

FIG. 2 illustrates results from simulations of the electric field E in the vicinity of a conductive foil edge 205 at which an FGM part 200 in the form of an FGM tape has been arranged. The conductive foil edge 205 in the extension of which an FGM part 200 has been arranged is shown, as well as two adjacent conductive foil edges 205A, which do not have any FGM part 200 (here referred to as conventional foil edges 205A). The electric field E at a particular voltage has been illustrated by equipotential curves 210 in a conventional manner. For purposes of illustration, an (imaginary) plane 215 which is perpendicular to the foils 120 has been drawn at the foil edge 205, to indicate where the conductive foil 120 having an FGM part 200 ends. Furthermore, the edge of the FGM part 200 has been indicated by reference numeral 220. As can be seen in the figure, the electric field is highly homogeneous between the conductive foils 120 at a distance from the foil edges. However, locally at the conventional foil edges 205A, the electric field is enhanced. At the foil edge 205 having an FGM part 200, on the other hand, the equipotential curves are distributed along the length of the FGM part 200, and in particular along the part of the FGM part 200 which extends beyond the foil edge 205.

Figure 3A:
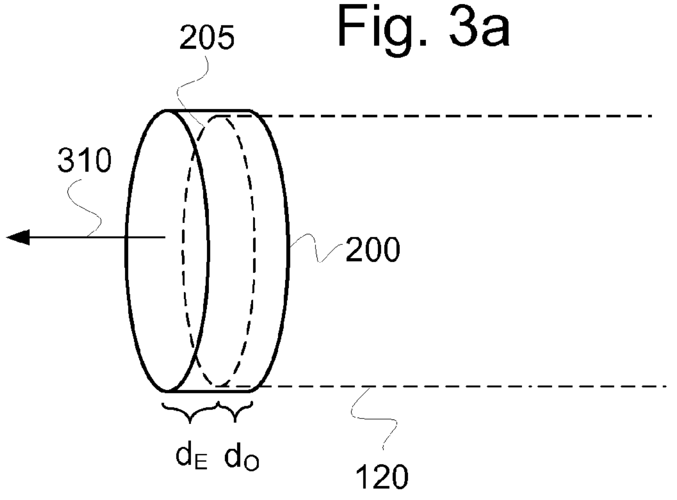
FIG. 3*a-c* shows different examples of how an FGM part can be arranged at an outer foils edge of a cylindrical conductive foil.
Figure 3B:
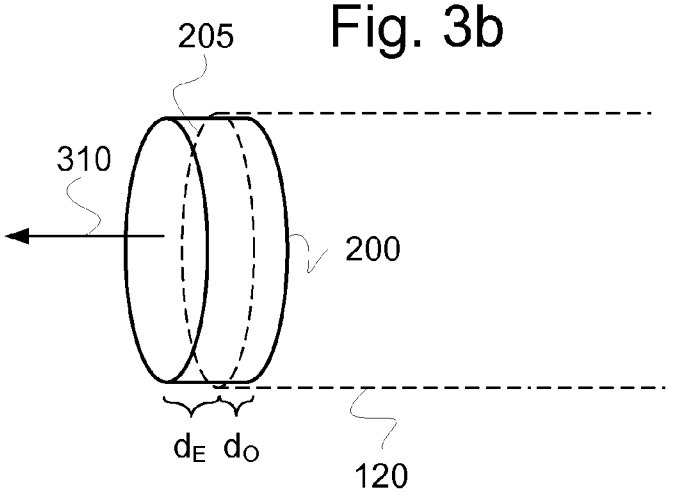
Figure 3C:
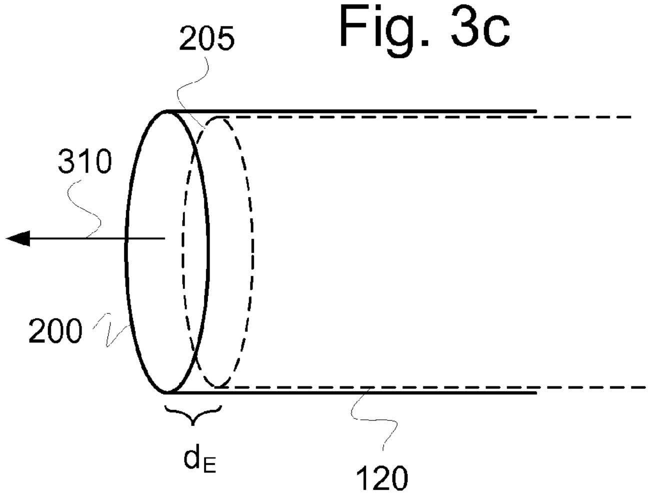

Different examples of an FGM part 200 arranged in the extension of a conductive foil edge at an end of the condenser core 115 are shown in FIGS. 3*a-c*. A conductive foil edge 205 at an end of the condenser core 115 will be referred to as an outer conductive foil edge 205. High electrical stress typically occurs locally in the region around the outer conductive foil edges 205, both during transient and in-service AC or DC voltage.

In FIGS. 3*a-c*, the contours of the FGM part 200 are indicated by unbroken lines, while the contours of the conductive foil 120 are indicated by dashed lines. The FGM parts 200 of FIGS. 3*a-c* extend a distance $d_E$ along an (imaginary) extension foil (not shown), where the imaginary extension foil extends from the foil edge 205 in a (continuous) set of extension directions, which are perpendicular to the foil edge 205 and parallel to a plane which is tangent to the conductive foil 120. An example of an extension direction is indicated in FIG. 3*a-c* by an arrow 310. The distance $d_E$ that an FGM 200 extends from a foil edge 205 into the space on the outer side of the imaginary plane 215 in an extension direction 310 will be referred to as the extension distance $d_E$ in this direction.

In the example shown in FIG. 3*a*, the FGM part 200 is formed as a cylinder which is arranged in the extension of the outer conductive foil edge 205 in a manner so that the FGM part 200 partly covers the conductive foil 120.

In the example of FIG. 3*b*, the FGM part 200 is formed as a cylinder which is arranged in the extension of the outer conductive foil edge 205 in a manner so that part of the FGM part 200 is enclosed by the conductive foil 120. In the example of FIG. 3*b*, the conductive foil 120 covers part of the FGM part 200.

In the examples shown in FIGS. 3*a* and 3*b*, the FGM part 200 and the conductive foil 120 overlap by an overlap distance $d_o$.

In the example of FIG. 3*c*, the FGM part 200 is formed as a cylinder which stretches along the entire length of the cylindrical conductive foil 120, and which extends beyond the outer conductive foil edges 205. Hence, in this example, the overlap distance $d_o$ corresponds to the entire length of the conductive foil 120. The FGM part 200 of FIG. 3*c* is shown to be arranged to cover the conductive foil 120. An FGM part 200 which stretches along the entire length of the cylindrical conductive foil 120 could alternatively be arranged on the inside of the conductive foil 120.

The FGM parts 200 shown in FIGS. 3*a-c* are examples only, and alternative embodiments of an FGM part 200 arranged in the extension of at least a part of a conductive foil edge may be used. For example, an FGM part 200 could be folded over the conductive foil edge 205 to cover the conductive foil edge 205 at both the inside and the outside. Furthermore, for illustrative purposes, the FGM parts of FIGS. 3*a-c* have been shown as cylinders of smooth lateral surfaces and straight, perpendicular base edges. However, other shapes of the FGM parts 200 may be used. For example, an FGM part 200 arranged in the extension of at least a part of a conductive foil does not have to be confined to the imaginary extension foil, but could occupy the space beyond the foil edge 205 in other directions as well. An FGM part 200 which is arranged in the extension of at least part of a conductive foil edge 205 extends, at least partly, beyond an imaginary plane 215 which is tangential to at least part of the foil edge 205 and perpendicular to the foil 120, into the space on the outer side of the imaginary plane 215 (i.e. the side which is not occupied by the foil 120). In one embodiment, the part of the FGM part 200 which is arranged in the extension of at least part of a conductive foil edge 205 is arranged substantially along the imaginary extension foil.

FIGS. 3*a-c* show different examples of FGM parts 200 arranged in the extension of an outer conductive foil edge 205 at one end of a condenser core 115. Typically, an FGM part 200 would be arranged in the same manner at the outer conductive foil edge 205 at the other end of the condenser core 115. In one embodiment, substantially every conductive foil 120 of a condenser core 115 is equipped with an FGM part 200 at every outer edge 205, providing efficient smoothening of the electric field at the outer foil edges 205. In this embodiment, it may be that every outer edge 205 is equipped with an FGM part 200, or that that all but one (e.g. the innermost) conductive foil 120, or all but a few, such as two or three conductive foils, are equipped with an FGM part 200 at the outer foil edges 205. An embodiment wherein substantially every conductive foil 120 is provided with an FGM part 200 is suitable where the electric field stress is approximately the same at the edges 205 of the different conductive foils 120. Oftentimes, the electric field varies throughout the bushing 100. An even electric field stress can then for example be achieved by varying the interfoil separation distance such that at locations of high electric field, the distance between adjacent foils 120 is smaller than at locations of lower electric field.

Further embodiments, wherein the conductive foils 120 which have been equipped with an FGM part 200 have been selected in a different manner, may also be contemplated. For example, there may be situations where the electrical stress is unevenly distributed between the foil edges. This may for example be the case when the bushing is subjected to high frequency transients. When the FGM part(s) 200 of a bushing 100 are designed to reduce the stress in such situations, the application of FGM part(s) 200 could for example be limited to those foil edges where high stress would be expected in such situations. One example of such a situation is where the field grading material serves to reduce the field stress in case of a fast, transient impuls which effects the outermost foil the most. In this situation, it may be sufficient to provide an FGM part 200 at the edges of the outermost foil.

In some bushings 100, one or more conductive foils 120 may have further edges than the outer edges 205 at the condenser core ends. This could for example be the case if an electrical tapping is connected at a conductive foil 120 for current and/or voltage sensing purposes. In order to connect to an inner conductive foil 120 (i.e. a conductive foil 120 which is surrounded by the outermost conductive foil 120), a tapping lead has to go through an opening in the outermost conductive foils 120 (and possibly further conductive foils 120, depending on which inner conductive foil 120 is to be connected to the tapping). Hence, such bushing 100 will have conductive foil edges inside the condenser core 115, here referred to as inner conductive foil edges. Due to resonances, formed by an interaction between the bushing 100 and the system/device to which the electrical terminals 112 of the conductor 110 are connected, over voltages can be induced along such inner foil edges, thus making such inner foil edges a potentially vulnerable part of the bushing 100.

Figure 4:
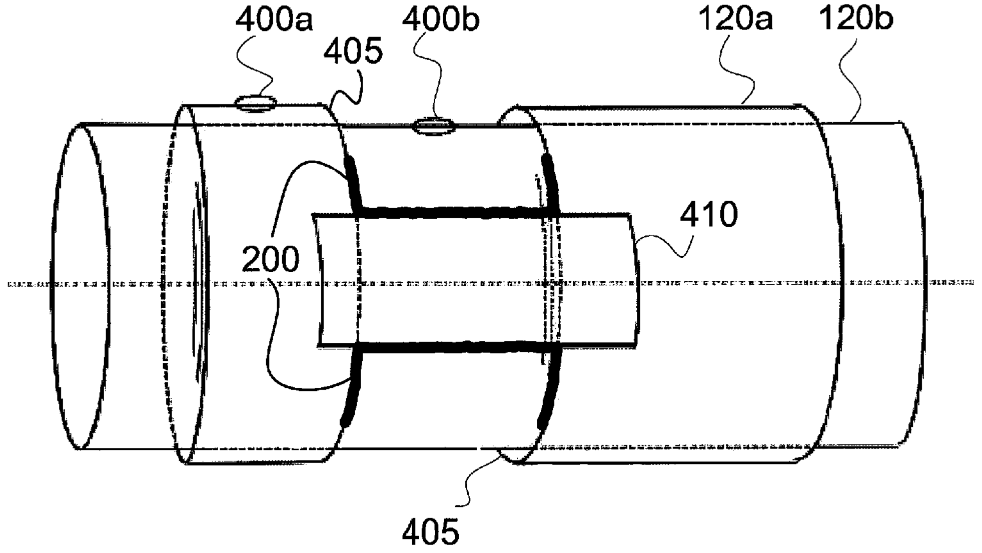
FIG. 4 shows an example of an FGM part arranged at an inner edge of a conductive foil.

An FGM part 200 could be applied to such inner foil edges in order to lower the electrical field stress and thereby mitigate the risk for partial discharge or breakdown. An example of two concentrically arranged conductive foils 120*a* and 120*b* are shown in FIG. 4, where the outer conductive foil 120*a* surrounds the inner conductive foil 120*b*. Measuring taps 400*a* and 400*b* are arranged on the conductive foils 120*a* and 120*b*, respectively. Outer conductive foil 120*a* of FIG. 4 has been opened in order to reach the inner conductive foil 120*b* with leads connecting the measuring tap 400*b*, thus creating an inner edge 405.

An FGM part 200 has been arranged in the extension of two different parts of the inner edge 405 (alternatively, the FGM part 200 of FIG. 4 can be seen as two FGM parts 200, each arranged at a part of the extension of the inner edge 405). The FGM part 200 of FIG. 4 extends from the conductive foil 120 along a direction which is perpendicular to the inner foil edge 405 and tangential to the conductive foil 120, i.e. along an extension direction. In FIG. 4, outer conductive foil 120*a* has been divided into two parts, interconnected with a bridge 410 which ensures that the two parts will be at the same electrical potential. Other ways of opening an outer conductive foil 120*a* may be employed.

Inner conductive foil edges 405 may appear in a condenser core 115 for other reasons than connecting measuring taps 400. For example, in some bushings 100, some or all of the conductive foils 120 (for example all but the outermost foil 120) are divided into two parts, which are of the same diameter and displaced in relation to each other in the axial direction of the bushing 100. Thus, such conductive foils 120 will have two outer edges 205 and two inner edges 405. An example of a bushing having conductive foils arranged in this manner is disclosed in U.S. Pat. No. 3,659,033.

The FGM part 200 and the conductive foil 120 should be in electrical contact in order to achieve efficient field grading at the foil edge 205/405. Electrical contact could for example be achieved by applying conductive glue between the FGM part 200 and the conductive foil 120, or by tightly arranging the FGM part 200 and the conductive foil 120 etc. In embodiments where the conductive foil 120 is used to provide mechanical support to the FGM part 200, the overlap distance $d_o$ should preferably be chosen such that sufficient mechanical support can be provided. In other cases, it might be sufficient for the FGM part 200 and the conductive foil 120 to touch, in order to provide for electrical contact between the two.

For a given bushing application, the design of the FGM part 200 involves the selection of a suitable field grading material and designing the dimensions of the FGM part 200, including determining a suitable extension distance $d_E$. Furthermore, a critical voltage, corresponding to a particular voltage across the bushing 100 above which the most efficient field grading is desired, could advantageously be selected. The field grading material could for example be chosen such that the electric field threshold $E_b$ lies below or at the local electric field strength expected at the foil edge 205/405 at the critical voltage. The threshold $E_b$ could for example be selected to approximately correspond to the local electric field strength expected within the bulk of the condenser core 115 at the critical voltage.

The critical voltage could for example be set so that the FGM part 200 would protect against transient voltages which would occur across the bushing 100 in case of failure, the FGM part 200 thus reducing the impact of any such transient voltages. A suitable critical voltage could then for example be set within a range of 2-4 times the nominal voltage of the bushing 100 (the nominal voltage being the maximum operating voltage for which the bushing is designed). The critical voltage could alternatively be set to, for example, the nominal voltage of the bushing 100, thus reducing the risk for partial discharge during normal operation of the bushing. Alternatively, the critical voltage could be set to a withstand voltage, for example at approximately twice the nominal bushing, or the BIL voltage. Other ways of defining the critical voltage condition may alternatively be used when suitably dimensioning the FGM part 200.

For a given field grading material, the extension distance $d_E$ could be chosen to be sufficiently long for the potential drop from the foil edge 205 to the edge 220 of the FGM part 200 to be distributed over a sufficient distance when the bushing 100 is exposed to the critical voltage. The extension distance $d_E$ could for example be selected such that the stress in the vicinity of the FGM part 200 will be kept below the partial discharge inception threshold of the dielectric insulating material in the voltage range for which field grading by the FGM part 200 is desired.

In one embodiment, the extension distance $d_E$ approximately corresponds to the radial distance between two adjacent conductive foils 120, also referred to as the interfoil separation distance, $d_I$. A suitable field grading material having suitable non-linear electric properties could in this embodiment for example be selected such that at the critical voltage, the electrical potential difference between the foil edge 205/405 and the edge 220 of the FGM part 200 will be of the same order of magnitude as the voltage between the conductive foil 120 and the adjacent conductive foils 120.

Figure 5A:
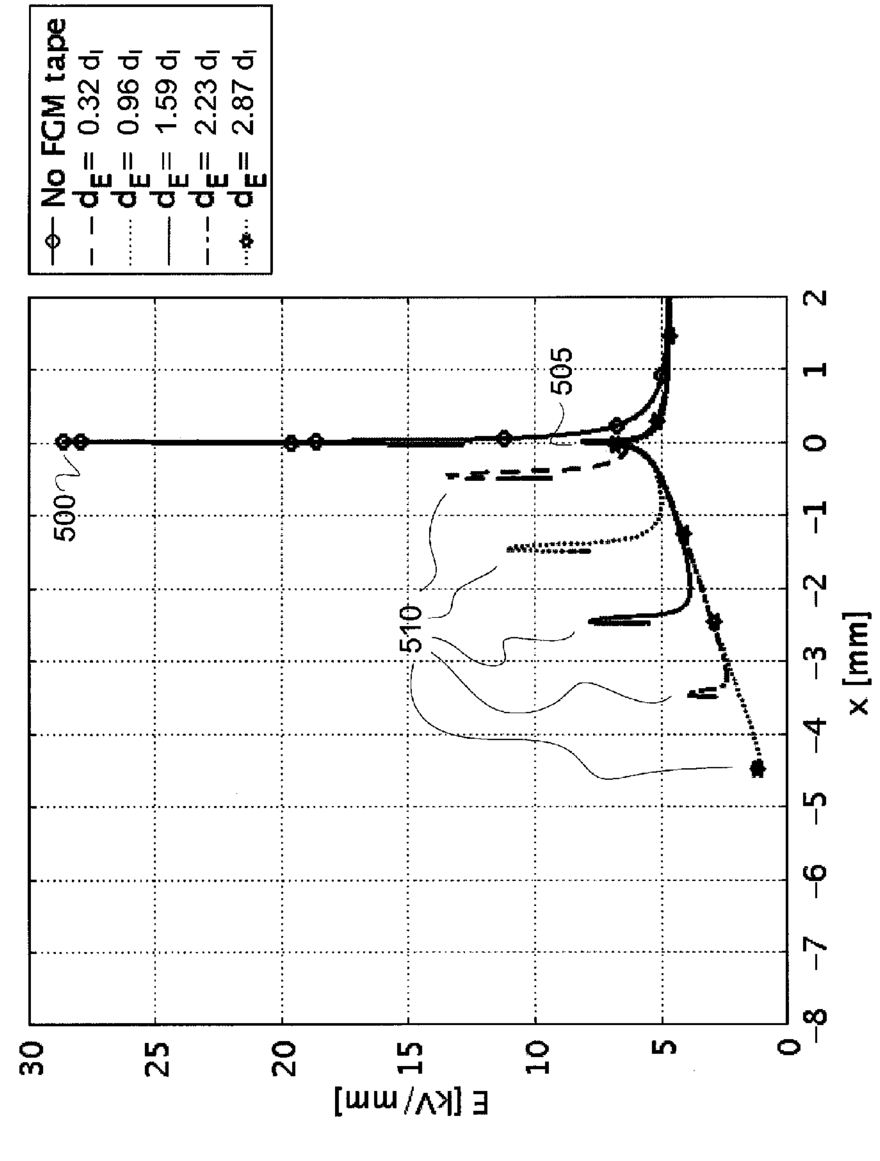
FIG. 5*a* shows results of simulations of the electric field strength in the axial direction of a bushing in the vicinity of a conductive foil edge for a number of different values of the extension distance.

FIG. 5a is a graph showing results from simulations of the magnitude of the electric field E in the extension direction 310 of a bushing 100. Simulated values of this magnitude at the underside of a conductive foil 120, and, in its extension, at the underside of the corresponding FGM part 200, are plotted as a function of distance x in the extension direction 310 for five different values of the extension distance $d_E$. The following relation was assumed to apply to the conductivity σ of the FGM material:

$$\sigma = \sigma_0 \cdot \left(1 + \left(\frac{E}{E_b}\right)^{\alpha}\right), \quad (1)$$

The following parameters were used in the simulations: Thickness of FGM part: 0.25 mm; thickness of conductive foils: 0.03 mm; interfoil distance $d_I$: 1.57 mm; low-field conductivity $\sigma_o$: $10^{-8}$ S/m; electric field threshold $E_b$: 1 kV/mm; exponent α: 4. The foil edge 205 was, in the simulations, located at x=0 mm. The material parameters used in these simulations correspond to a typical SiC-based FGM material to which conductive particles have been added in order to increase the value of $\sigma_o$. The same material properties were used in the simulations by which FIG. 2 was obtained.

The five different values of the extension distance $d_E$ for which simulations are shown in FIG. 5a are: 0.32 $d_I$, 0.96 $d_I$, 1.59 $d_I$, 2.23 $d_I$ and 2.87 $d_I$. In addition, the result when there is no FGM part 200 is also shown. As can be seen in FIG. 5a, a peak 500 appears at the foil edge 205/405 when no FGM part 200 is applied. The use of an FGM part 200 drastically reduces the peak at the foil edge 205/405, the remaining peak at the foil edge 205/405 indicated by reference numeral 505. When an FGM part 200 is applied at the foil edge 205/405, the height of the remaining peak 505 is basically independent of how far the FGM part 200 extends—a similar magnitude of the remaining peak 505 is obtained regardless of the extension distance $d_E$ of the FGM part 200.

As expected, an additional peak 510 appears when an FGM part is introduced, this additional peak appearing at the edge 220 of the FGM part 200. This additional peak 510 is considerably lower than the peak 500 appearing at the foil edge 205/405 when no FGM part is used. The magnitude of this additional peak 510 partly depends on the field grading properties of the FGM material, and partly on the increased geometrical field grading properties due to the greater thickness of the FGM part 200 than of the conductive foil 120. As can be seen in FIG. 5a, for the FGM material and geometry at hand, $d_E \approx 1.6\, d_I$ provides the most efficient field grading. For higher values of the extension distance $d_E$, the magnitude of the additional peak 510 at the edge 220 of the FGM part 200 will be lower than the magnitude of the remaining peak 505 at the foil edge 205/405. This further reduction of the electric field at the edge 220 of the FGM part 200 will not improve the electric stress situation for the bushing 100, and any further extension of the FGM part 200 beyond $d_E \approx 1.6\, d_I$ can thus be considered unnecessary. For lower values of the extension distance $d_E$, in the other hand, the potential of the field grading material is not fully exploited in that the additional peak 510 at the edge 220 of the FGM part is higher than the remaining peak 505 at the foil edge 205/405.

Figure 5B:
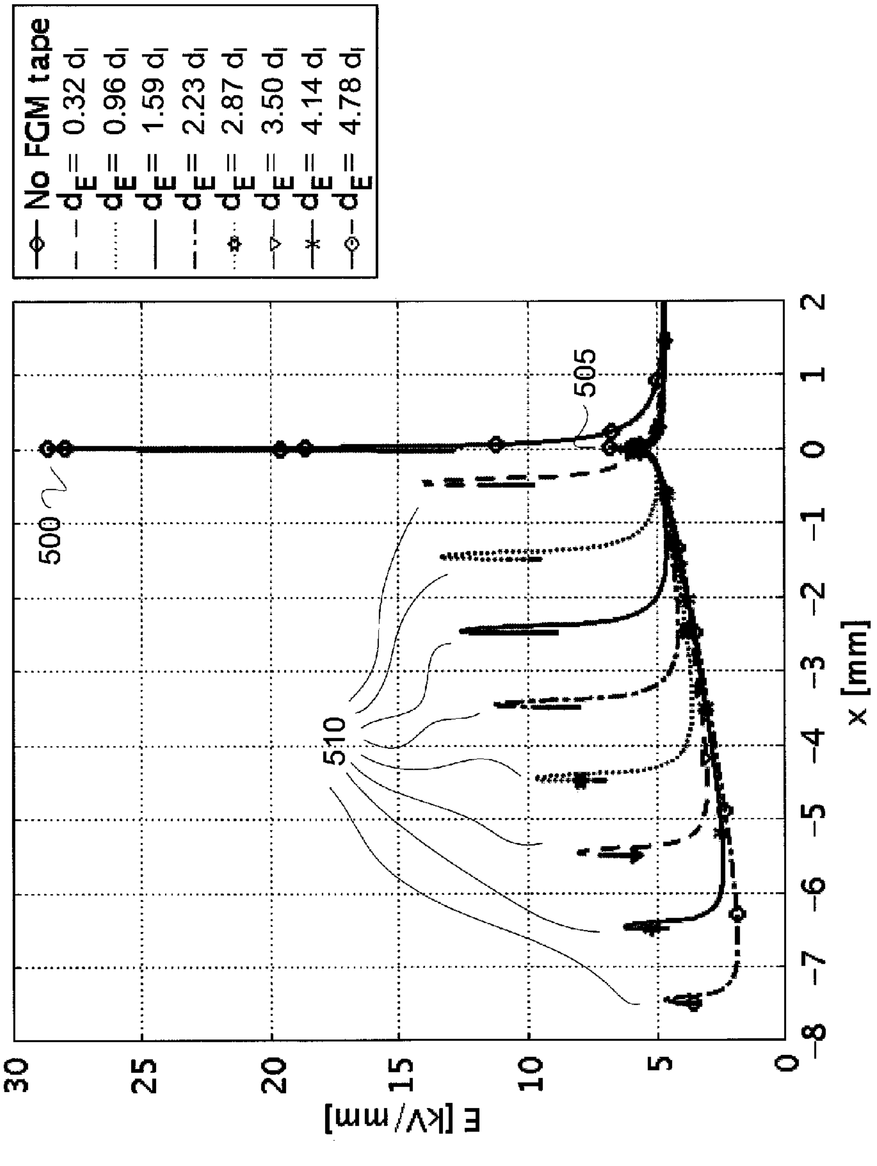
FIG. 5*b* shows results of simulations of the electric field strength in the axial direction of a bushing in the vicinity of a conductive foil edge for a number of different values of the extension distance, for a different FGM material than in FIG. 5*a*.

The optimal ratio of the extension distance $d_E$ to the interfoil distance $d_I$ will vary somewhat depending on the properties of the FGM material, as well as on the ratio of the thickness of the foil 120 to the thickness of the FGM part 200. In FIG. 5b, results are shown of simulations of a further bushing 100, having an FGM part 200 with a higher value of the low-field conductivity than the FGM part 200 of FIG. 5a. The other parameters of the bushing are the same as in the simulations shown in FIG. 5a. The low-field conductivity of the FGM material has been increased to $\sigma_o$=1.4 $10^{-7}$ S/m, i.e. an increase of nearly 15 times. From FIG. 5b it can be concluded that, for the FGM material and geometry for which the simulations shown in FIG. 5b were performed, an extension distance, $d_E \approx 4.1\, d_I$ provides the most efficient field grading.

The FGM material of the simulation shown in FIG. 5*b* can be considered non-standard, since it combines high conductivity with a significant non-linearity.

As can be seen from a comparison of FIGS. 5*a* and 5*b*, the reduction in the magnitude of the remaining peak 510 due to the increase in the conductivity of the FGM material is comparatively small. Any further increase in the low-field conductivity $\sigma_0$ will only contribute the reduction in magnitude of the remaining peak in a minor way, and thus, for a geometry wherein the ratio between the foil and FGM part thicknesses is that used in the simulations shown, there is generally no need of further increasing the extension distance beyond approximately four times the interfoil distance. We therefore conclude that a ratio of $d_E$ to $d_I$ within the range of 0.3-4 will, in most cases, provide efficient field grading at an edge of a foil 205/405. For a typical SiC-based material similar to the one used in the simulations illustrated in FIG. 5*a*, an extension distance $d_E$ within the range of [0.7 $d_I$; 3 $d_I$], or [0.9 $d_I$; 2 $d_I$] will often provide efficient field grading. As the low-field conductivity $\sigma_0$ is increased, the optimal ratio of $d_E$ to $d_I$ will typically increase somewhat. However, even for the more extreme materials, like the one simulated in FIG. 5*b*, an extension distance of four times $d_I$ or lower will typically be sufficient.

Figure 6:
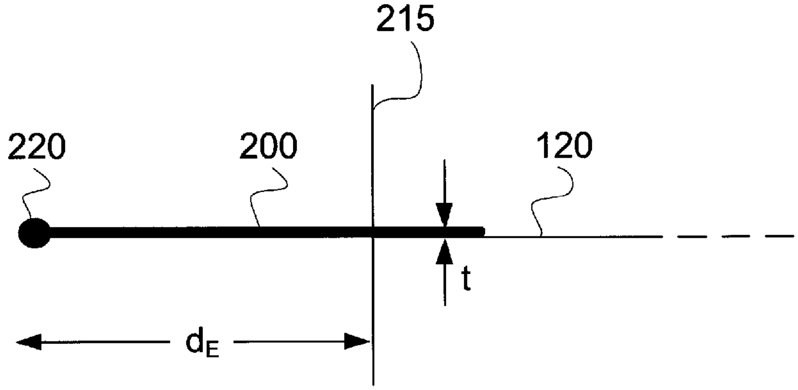
FIG. 6 shows a cross-sectional view of an example of an FGM part having an edge which is geometrically arranged to further provide geometrical field grading.

A decrease in the ratio of the thickness of the FGM part 200 to the thickness of the conductive foil 120 would increase the optimal extension distance $d_E$ and vice versa, since a reduction in FGM part thickness would increase the magnitude of the additional peak 510, and a decrease in foil thickness would decrease the magnitude of the remaining peak 505. However, in most cases, an extension distance $d_E$ of four times $d_I$, or lower, will be sufficient. If, in an application, a thickness ratio is desired which yields an optimal extension distance considerably exceeding four times $d_I$, geometrical field grading could be applied at the edge 220 of the FGM part 200. This could for example be the case if further savings on FGM material are desired, or if a thicker foil 120 is required. An example of such geometrical field grading is shown in FIG. 6 below.

The electric field between two adjacent foils 120 is around 5 kV/mm in the simulated scenarios shown in FIGS. 5*a* and 5*b*. Thus, the electric field peak magnitude obtained by means of the FGM part 200 is of the same order of magnitude as the electric field between two adjacent foils 120.

We have realized that there is generally no need for the extension distance $d_E$ of an FGM part 200 to be larger than around four times the interfoil separation distance. If the extension distance is large, the electrical stress at the foil edges 205 will be lower than the electrical stress in the bulk of the condenser core 115. Thus, in order to avoid an unnecessary usage of field grading material, an efficient extension distance typically lies within the range 0.3-4 interfoil separation distances. A larger extension distance will involve unnecessary costs, since the additional field grading material will not contribute significantly to the desired field grading.

By selecting the extension distance of an FGM part within the range of approximately four times the interfoil separation distance or less, the cost of the bushing can be reduced in that less FGM material will be used than if FGM parts of larger extension distance were used.

If desired, the extension distance $d_E$ could vary along a conductive foil edge 250/405—for example, as shown in FIG. 4, an FGM part 200 could be arranged in the extension of only part of a conductive foil edge 205/405. Smaller and/or more local variations of the extension distance $d_E$ along a foil edge 205/405 may also be employed.

In an implementation wherein the interfoil separation distance varies throughout the bushing 100, as discussed above, and wherein more than one conductive foil 120 is equipped with an FGM part 200, the extension distance $d_E$ could be constant for all FGM parts 200, or could be shorter for foils 120 at a location where the interfoil separation distance is smaller, the interfoil separation distance being the radial distance between the conductive foil, in the extension of which the FGM part is arranged, and an adjacent conductive foil. When the extension distance takes the same value for all FGM parts 200, such value could for example be selected in dependence on the largest extension distance of the bushing, so that the FGM part 200 lies within the range of four times the largest extension distance or less.

The dimension of the FGM part 200 in the radial direction of the bushing, here referred to as the thickness of the FGM part 200, will often be selected to be smaller than the extension distance $d_E$. A smaller thickness means lower costs for the material. Furthermore, in some applications, it might be necessary to consider the thermal properties of the field grading material and/or the dielectric insulating material when selecting a suitable thickness of the FGM part 200. A thinner FGM part 200 will dissipate less heat than a thicker FGM part 200 of the same field grading material, and a thinner FGM part 200 is therefore desirable for thermal reasons.

If the part of the FGM part 200 that extends beyond the foil edge 205/405 is assumed to be in the shape of a cylinder at a radial distance $D_r$ from the longitudinal axis of the bushing 100, and assumed to have a length $d_E$ and a thickness t, the losses $P_{fgm}$ occurring in the FGM part 200 can be described as:

$$P_{fgm} = I_{fgm}^2 R_{fgm} = \frac{(V_{fgm})^2}{R_{fgm}} \approx \frac{2 \cdot \pi \cdot (V_{fgm})^2 \sigma_{fgm} D_r t}{d_E}, \tag{2}$$

where $V_{fgm}$ is the potential difference between the foil edge 205/405 and the edge 220 of the FGM part 200, $R_{fgm}$ is the resistance of the FGM part 200 and $\sigma_{fgm}$ is the conductivity of the FGM part 200. In an FGM part 200 having non-linear resistive properties, the conductivity $\sigma_{fgm}$ will typically vary along the extension of the FGM part 200 for electric fields above the electric field threshold. However, by using the highest expected value of $\sigma_{fgm}$ when estimating the thermal losses, an upper limit for the losses can be obtained. Furthermore, when an FGM part 200 is arranged at several concentric conductive foils 120, the radial distance $D_r$ from the longitudinal axis of the bushing will typically be larger for the FGM parts 200 arranged at the outer conductive foils 120. By using the largest value of the radial distance $D_r$, a maximum value of the losses may be estimated. An estimated maximum value of the losses $P_{fgm}$ could be compared with the highest losses that are thermally acceptable, and the dimensions of the FGM part could be selected accordingly. When dimensioning the FGM part 200, it is also advantageous to consider that there is often a (material dependent) minimum thickness, relating to the finite size of the filler particles, beyond which the field grading material no longer exhibits the non-linear electric properties of the bulk material. Hence, the thickness of the FGM part 200 could preferably exceed this minimum thickness. For finer particle sizes, the minimum thickness is typically lower. However, very fine particle sizes typically lead to increased manufacturing costs.

An FGM part 200 could for example be made from a tape of a suitable field grading material, such as for example a ZnO tape as disclosed in EP1736998. An FGM tape used to form an FGM part 200 could be non-adhesive, or could be adhesive in order to stick to the conductive foil 120. A conductive adhesive, such as e.g. thixotropic paint, could for example be used. An FGM part 200 made from a tape could for example cover only an area in the vicinity of a foil edge 205/405, for example as shown in FIGS. 3*a-c* and in FIG. 4.

An FGM part 200 could alternatively be formed by applying the field grading material on the dielectric insulating material between different conductive foils 120 of the condenser core 115 (such dielectric material being for example paper). When applying a layer of field grading material on the dielectric insulating material, the FGM part 200 could be arranged to cover the vicinity of the foil edges 205/405 only, for example as shown in FIGS. 3*a-b* and in FIG. 4, or the FGM part 200 could be arranged to extend along the entire conductive foil, as shown in FIG. 3*c*, or the overlap distance $d_o$ could take any suitable value. The field grading material could for example be applied as a coating by means of spraying or painting.

In a method of forming the conductive foils 120 of a condenser core 115 wherein the conductive foils 120 are applied on the dielectric insulator 123 in the form of for example conductive ink (applied for example by means of spraying), the FGM part 200 could be applied to the dielectric insulator 123 in the same process as the conductive foils, or be applied separately.

The dielectric insulating material of a bushing 200 is often impregnated with oil or resin in order to improve the dielectric properties of the insulating material. In one implementation of the present technology, the field grading material, for example in the form of a powder, is mixed with the oil or resin before impregnating the dielectric insulating material. Hence, the impregnated dielectric insulating material will in this method form FGM parts 200. When using this method of forming the FGM parts 200, the dielectric losses in the bushing 100 upon use will often be higher than if the FGM part 200 is applied locally to the foil edges 205/405, and furthermore, the amount of field grading material required will be larger. However, this method of forming FGM parts 200 is efficient in that the manufacturing steps will be simple. Hence, in an implementation wherein simple manufacturing is more important than the magnitude of the dielectric losses, this method can be suitable.

The use of at least one FGM part 200 as described above in a bushing 100 to grade a locally enhanced electric field could, if desired, be combined with other ways of obtaining local field grading. For example, geometrical field grading may also be used. If desired, an additional geometrical field grading arrangement could be employed, or the edge 220 of an FGM part 200 could be of a suitable shape to further improve the field grading properties. For example, a cross-section of the edge of the FGM part 200 could for example have a circular area of diameter larger than the thickness t of the FMG part 200, or the edge of the FGM part 200 could be of another field grading curvature, such as an elliptic shape, or a rectangular shape with rounded corners. The combination of material dependent field grading obtained by the FGM part 200 with other means of field grading could for example be useful in situations when restrictions on the dimensioning of the FGM part 200 does not allow for a design which provides sufficient field grading at an acceptable heat loss (cf. expression (2)), or in order to save FGM material by making the main part of the FGM part 200 thinner. The FGM part 200 could then be designed such that partial field grading is provided at acceptable heat loss, while additional field grading could be provided by other means. Since the FGM part 200 will provide a considerable contribution to the local field grading, the diameter of the geometrical shape at the edge of the FGM part 200 could be smaller than if no FGM part 200 was employed, the geometrical shape at the edge thus contributing less to the bushing diameter. An example of a cross-section of an FGM part 200 having a circular cross-sectional edge 220 is shown in FIG. 6.

Figure 7:
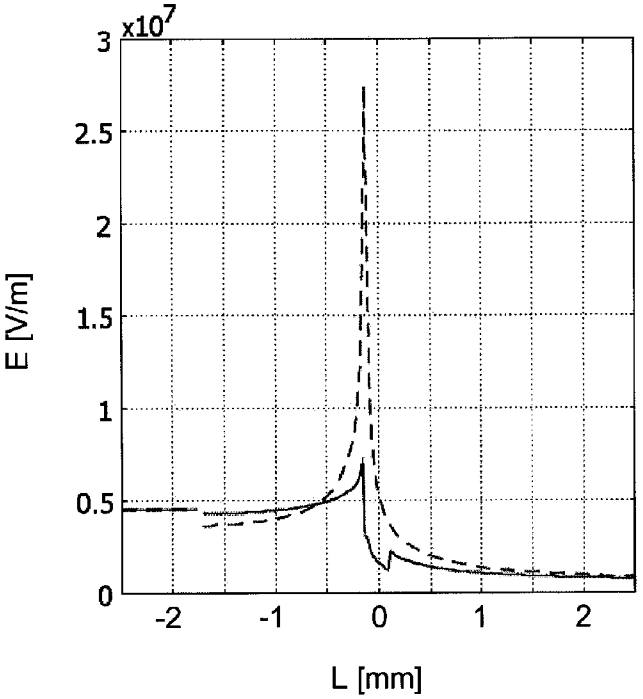
FIG. 7 is a graph showing simulation results of the electric field strength in the vicinity of a conductive foil edge with (continuous line) and without (broken line) an FGM part.

FIG. 7 shows the simulation results of FIG. 2 in a graph where the magnitude of the electric field E in an extension direction 310 is shown as a function of position L, also referred to as the arc length, along a line in the radial direction of the bushing at the foil edge 205. The dashed and solid curves denote, respectively, the electric field at foil edges without (cf. foil edge 205A of FIG. 2) and with (cf. foil edge 205 of FIG. 2) an FGM part 200. As can be seen in the graph, the electric field exhibits a peak at the foil edge both with and without an FGM part 200. However, the peak in the case where the foil edge 205 has an FGM part 200 is considerably lower than the peak in the conventional case (by a factor ¼).

Although simulations are simplified, here for example in that no account has been taken for space charge effects in the insulating material, the simulations performed clearly show that a great reduction in electric field stress around conductive foil edges 205 can be achieved by the application of an FGM part 200.

The decreased stress enhancement at conductive foil edges 205/405 which can be achieved by use of FGM parts 200 having a suitable electric field threshold allows for an increase in the average field between conductive foils 120 as compared to when no FGM parts 200 are employed. Hence, with maintained bushing dimensions, a bushing employing such FGM parts 200 can be rated for higher voltages. Alternatively, if the voltage rating is maintained, the dimensions of the bushing 100 can be reduced, resulting in a lower product cost and smaller physical space requirements for the bushing installation.

Furthermore, by use of FGM parts 200 at conductive foil edges 205/405 in a bushing 100, the failure rate of the bushing can be reduced. The risk for flashovers, possibly causing insulation puncture, and for partial discharges, resulting in ageing and eroding of the surrounding insulation, is high at spots where the electric field is locally enhanced. By use of FGM parts 200 at conductive foil edges 205/405, local field enhancement at the conductive foil edges 205/405 can be reduced, and hence, the rate of failure at the foil edges 205/405 can be reduced.

The present technology is suitable for use in high voltage bushings, as well as for low and medium voltage bushings. The technology can advantageously be used in AC voltage bushings as well as in DC voltage bushings.

Although various aspects of the invention are set out in the accompanying independent claims, other aspects of the invention include the combination of any features presented in the above description and/or in the accompanying claims, and not solely the combinations explicitly set out in the accompanying claims. One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

What is claimed is:

1. An electrical bushing for providing electrical insulation of a conductor extending through the bushing, the bushing comprising:

a condenser core having at least two conductive foils concentrically arranged around the conductor location; and at least one FGM part comprising a field grading material and at least partly arranged in the extension of at least part of a foil edge of at least one of the at least two conductive foils; wherein the FGM part and the at least two conductive foils, in the extension of which the FGM part is arranged, are in electrical contact, and the FGM part extends beyond at least part of the conductive foil edge over an extension distance, the bushing being characterized in that the extension distance lies within the range of four times an interfoil separation distance of the bushing or less; and a surface of at least one FGM part contacts a surface of at least one of the conductive foils.

2. The electrical bushing of claim 1, wherein the extension distance lies within the range of 0.3 to 4 times the interfoil separation distance.

3. The electrical bushing of claim 2, wherein the extension distance, over which an FGM part extends beyond at least part of the conductive foil edge, substantially corresponds to the interfoil separation distance.

4. The electrical bushing of claim 1, wherein the field grading material is a non-linear field grading material.

5. The electrical bushing of claim 1, wherein the electric properties of the field grading material are such that the voltage between the foil edge and the edge of the FGM part will, at a particular voltage across the bushing, be of the same order of magnitude as the voltage between the conductive foil and the adjacent conductive foils, where the particular voltage is one of the nominal voltage, a basic insulation level, a withstand voltage at approximately twice the nominal voltage, or a transient voltage in the range of 2-5 times the nominal voltage of the bushing.

6. The electrical bushing of claim 1, wherein the extension distance is selected such that the electric field strength at the edge of the FGM part will be below the partial discharge inception threshold of the dielectric insulating material at least for voltages below a particular voltage, where the particular voltage is one of the nominal voltage, a basic insulation level, a withstand voltage at approximately twice the nominal voltage, or a transient voltage in the range of 2-5 times the nominal voltage of the bushing.

7. The electrical bushing of claim 6, wherein the extension distance is selected such that the electric field strength at the edge of the FGM part will be below the partial discharge inception threshold of the dielectric insulating material even for a voltage range above said particular voltage.

8. The electrical bushing of claim 1, wherein an electrical field threshold of the field grading material, above which the field grading capability of the field grading material increases non-linearly with increasing electric field strength, lies above the local electric field strength expected at the foil edge at the nominal voltage of the bushing.

9. The electrical bushing of claim 8, wherein the electrical field threshold of the field grading material, above which the field grading capability of the field grading material increases non-linearly with increasing electric field strength, lies above the local electric field strength expected at the foil edge at twice the nominal voltage of the bushing.

10. The electrical bushing of claim 1, wherein an electrical field threshold of the field grading material, above which the field grading capability of the field grading material increases non-linearly with increasing electric field strength, lies below the local electric field strength expected at the foil edge at the nominal voltage of the bushing.

11. The electrical bushing of claim 1, wherein the bushing comprises a plurality of concentrically arranged conductive foils, each conductive foil having two outer foil edges; and an FGM part is arranged in the extension of every outer foil edge, or in the extension of every outer foil edge but one, two or three foil edges.

12. The electrical bushing of claim 1, wherein the bushing comprises a plurality of concentrically arranged conductive foils, each conductive foil having two outer foil edges; and an FGM part is arranged in the extension of the outer foil edges of the outermost foil only.

13. The electrical bushing of claim 1, wherein at least one conductive foil has an inner edge in addition to two outer edges; and an FGM part is at least partly arranged in the extension of at least part of said inner edge.

14. The electrical bushing of claim 12, wherein said inner edge is an edge of an opening in a conductive foil through which conductive leads can be arranged.

15. The electrical bushing of claim 13, wherein a conductive foil is divided into two parts having the same diameter and being displaced in relation to each other in the axial direction of the bushing, the conductive foil edge of a first part facing the other part forming an inner conductive foil edge; and an FGM part is at least partly arranged in the extension of at least part of said inner edges.

16. The electrical bushing of claim 1, wherein the outer edge of the FGM part is of a field grading geometrical shape.

17. The electrical bushing of claim 1, wherein the FGM part comprises a tape of field grading material of non-linear electric properties.

18. The electrical bushing of claim 1, wherein the bushing further comprises a dielectric insulator concentrically arranged around the conductor location between two conductive foils; and field grading material has been applied to at least part of a dielectric insulator to form an FGM part.

19. The electrical bushing of claim 1, wherein the field grading material comprises a composite polymer filled with particles to provide the field grading effect.

20. The electrical bushing of claim 1, wherein the field grading material is a non-linear resistive field grading material.

21. The electrical bushing of claim 1, wherein the field grading material is a non-linear capacitive field grading material.

22. A transformer tank comprising an electrical bushing according to claim 1.

23. A power transmission system comprising an electrical bushing according to claim 1.

* * * * *